United States Patent
Riccardi et al.

(10) Patent No.: US 11,041,270 B2
(45) Date of Patent: Jun. 22, 2021

(54) SUPERFICIALLY TREATED FLEXIBLE MATERIALS SUITABLE FOR FILTERING AND SEPARATING IMMISCIBLE LIQUIDS

(71) Applicant: Universita' degli Studi Di Milano-Bicocca, Milan (IT)

(72) Inventors: Claudia Riccardi, Milan (IT); Stefano Zanini, Milan (IT)

(73) Assignee: Universita' degli Studi Di Milano-Bicocca, Milan (IT)

( * ) Notice: Subject to any disclaimer, the term of this patent is extended or adjusted under 35 U.S.C. 154(b) by 416 days.

(21) Appl. No.: 16/097,694

(22) PCT Filed: May 3, 2017

(86) PCT No.: PCT/IB2017/052575
§ 371 (c)(1),
(2) Date: Oct. 30, 2018

(87) PCT Pub. No.: WO2017/191577
PCT Pub. Date: Nov. 9, 2017

(65) Prior Publication Data
US 2020/0362507 A1 Nov. 19, 2020

(30) Foreign Application Priority Data

May 4, 2016 (IT) ........................ 102016000045935

(51) Int. Cl.
| | | |
|---|---|---|
| *C02F 1/40* | (2006.01) | |
| *B01D 17/04* | (2006.01) | |
| *D06M 11/83* | (2006.01) | |
| *D21H 25/04* | (2006.01) | |
| *B01D 39/08* | (2006.01) | |
| *D06M 10/06* | (2006.01) | |
| *D06M 23/00* | (2006.01) | |
| *D21H 25/02* | (2006.01) | |
| *D21H 27/08* | (2006.01) | |
| *C02F 101/32* | (2006.01) | |
| *D06M 101/32* | (2006.01) | |
| *D06M 101/34* | (2006.01) | |

(52) U.S. Cl.
CPC .......... *D06M 11/83* (2013.01); *B01D 17/045* (2013.01); *B01D 39/083* (2013.01); *C02F 1/40* (2013.01); *D06M 10/06* (2013.01); *D06M 23/00* (2013.01); *D21H 25/02* (2013.01); *D21H 25/04* (2013.01); *D21H 27/08* (2013.01); *B01D 2239/0414* (2013.01); *B01D 2239/0421* (2013.01); *C02F 2101/32* (2013.01); *D06M 2101/32* (2013.01); *D06M 2101/34* (2013.01)

(58) Field of Classification Search
CPC ....... C02F 1/40; C02F 2101/32; B01D 17/045
USPC .................................. 210/799; 427/569, 576
See application file for complete search history.

(56) References Cited

U.S. PATENT DOCUMENTS

| | | | | |
|---|---|---|---|---|
| 5,344,462 A | * | 9/1994 | Paskalov | D21H 25/04 |
| | | | | 427/569 |
| 2014/0275692 A1 | | 9/2014 | Patel et al. | |
| 2015/0191868 A1 | * | 7/2015 | Lee | D06M 10/06 |
| | | | | 428/391 |
| 2015/0284269 A1 | * | 10/2015 | Hwang | C02F 1/40 |
| | | | | 210/490 |
| 2015/0328565 A1 | | 11/2015 | Swaminathan et al. | |
| 2018/0327963 A1 | * | 11/2018 | Damour | D06M 11/83 |

FOREIGN PATENT DOCUMENTS

| | | |
|---|---|---|
| EP | 2905374 A2 | 8/2015 |
| EP | 2929925 A2 | 10/2015 |

OTHER PUBLICATIONS

Search Report and Written Opinion of PCT/IB2017/052575 dated Aug. 2, 2017.

* cited by examiner

*Primary Examiner* — Christopher Upton
(74) *Attorney, Agent, or Firm* — Silvia Salvadori, P.C.; Silvia Salvadori

(57) ABSTRACT

Process for the plasma surface treatment under vacuum of a fabric, nonwoven fabric or paper material for obtaining materials to be used for the filtration and separation of two immiscible liquids.

8 Claims, 1 Drawing Sheet

SUPERFICIALLY TREATED FLEXIBLE MATERIALS SUITABLE FOR FILTERING AND SEPARATING IMMISCIBLE LIQUIDS

This application is a U.S. national stage of PCT/IB2017/052575 filed on 03 May 2017, which claims priority to and the benefit of Italian Application No. 102016000045965 filed on 04 May 2016, the contents of which are incorporated herein by reference in their entireties.

FIELD OF THE INVENTION

The present invention relates to a method for treating with plasma processes flexible materials (technical fabrics, non-woven fabrics, paper, polymeric membranes, hollow fibre membranes) for the filtration, in particular for the separation, of immiscible liquids.

STATE OF THE ART

The pollution of water due to industrial waste and to accidental spillages of oil has disastrous effects on ecosystems and involves enormous costs for the decontamination of the involved areas. The development of a technology that effectively separates water from organic pollutants is therefore of extreme interest. Currently, there are two types of approach for the separation of the water from the oils contained in it:
1. Absorption Method: the organic contaminant is selectively absorbed by an absorbing medium. A disadvantage of this method lies in the use of the absorbent material, which limits the amount of oil that can be separated (the absorption of large amounts of oil involves the use of large amounts of absorbent material, with considerable costs). Another disadvantage lies in the fact that the oil-impregnated material must be treated in a second step, which obviously involves additional costs.
2. Gravity Method: exploits the gravity difference between water and oil and does not use consumable materials like the previous absorbent material. The main disadvantage of this technique lies in the poor effectiveness of separation: the obtained oil contains large amounts of water, which limit its reuse.

A more recent approach is the creation of super-hydrophilic or super-hydrophobic surfaces by using different techniques for surface modification. Filters obtained with these techniques allow the selective passage of one of the two liquids, while retaining the other one. Super-hydrophobic surfaces are those that show a contact angle with $H_2O$ larger than 150°, while super-hydrophilic surfaces are those that show a contact angle with $H_2O$ smaller than 10°.

For example, the patent US20110303620 develops coatings on filters by using chemical products that create a super-oleophobic and super-hydrophilic layer. The thus developed filters retain the oils and let selectively pass only water.

Vice versa, the patent US20120223011 describes a method for creating super-hydrophobic and oleophilic surfaces. Filters which have been surface treated with this method are then able to retain water and let selectively pass only oils.

The patent US2012/0000853 A1 develops super-hydrophilic and oleophobic coatings by PEGDA (polyethylene glycol diacrylate) containing fluorinated POSS (oligomeric polyhedral silsesquioxanes). The patent US2008/0248263A1 describes instead the obtainment of super-hydrophilic or super-hydrophobic surfaces by chemical vapour deposition. Other super-hydrophilic and oleophobic coatings (hydrogels, hydrogels containing nanoclays, coatings with zeolites, titanium dioxide structured coatings, graphene oxide coatings) are widely described in the literature. A super-hydrophilicity of the surfaces is also obtained by altering the roughness through mechanical techniques (sandpaper) or chemical techniques (acid or basic baths).

The patent US20150203370A1 describes a structure consisting of two filtering layers. The two layers have a combination of micro- and nanostructures (protrusions and depressions) and are super-hydrophilic, therefore capable of separating a water/oil mixture letting selectively pass only the first element.

Contrary to the case of the oil/water separation, of which many examples of processes exist in the literature, the separation of two immiscible organic liquids by filtration is a much less known and studied process. Generally, in fact, these mixtures are separated by gravity (with the aforesaid problems) or by distillation. To our knowledge, the only example of separation by filtration of two immiscible organic liquids is described in the scientific article of Jiang et al. (A General Strategy for the Separation of Immiscible Organic Liquids by Manipulating the Surface Tensions of Nanofibrous Membranes, Angew. Chem. Int. Ed. 2015, 54, 14732-14737) in which the authors make a coating by means of a treatment with different chemical compounds (containing or non-containing fluorocarbons). The thus modified surfaces have different surface energies, and in some cases let selectively pass one of the two liquids of a mixture of immiscible organic liquids, while retaining the other one. As the title says, the used strategy is general (coatings setting the surface energy value of the filters); however, the disadvantage lies in the fact that it cannot identify a single coating that effectively separates different binary mixtures. This means that each mixture needs its own suitable coating.

The patent EP2929925 describes a material for the oil-water separation obtained with a process for the treatment of woven fabric and nonwoven fabric by means of a plasma treatment.

This process requires the presence of a metal mesh over the substrate.

Moreover, this process provides that the material subjected to this kind of treatment is arranged on the cathode, where, as widely described in the literature, the effect of the self-bias produces a considerable increase in the temperature, well above the room temperature.

The Applicant has found that this type of process does not allow treating materials with thicknesses of 500 μm or less, as demonstrated in the comparative example, wherein the treatment under these conditions for times shorter than 2 minutes does not allow achieving the degree of roughness that enables the water-oil separation, but after only 2 minutes of this treatment the material decomposes by melting on the cathode.

SUMMARY OF THE INVENTION

The Applicant has found a surface modification process that allows making filters effectively separating any pair of immiscible liquids. In particular, it effectively separates mixtures with two immiscible liquid phases A and B, wherein the liquid phase A, present in a concentration ranging from 99.99% to 50%, passes through the filter, while the liquid phase B, present in a concentration ranging from 0.01% to 50%, is retained thereby.

The object of the present invention is a method for modifying the surface of a flexible substrate, formed by a single plasma process under vacuum. This process modifies both the chemical characteristics and the morphological characteristics of the surface of the flexible substrate, conferring to it the ability to let selectively pass one of the two phases of a mixture of immiscible liquids, while retaining the other one. In particular, the process object of the present invention comprises the following steps:

STEP 1—placing the flexible substrate to be treated, having a thickness of between 15 μm and 500 μm, in the plasma reactor on the grounded electrode or close to said grounded electrode;

STEP 2—evacuation and degassing: a pumping step wherein the entire system is evacuated and brought to low pressures, higher than $10^{-6}$ mbar;

STEP 3—filling the reactor with the process gas at pressures of between 0.001 and 10 mbar;

STEP 4—plasma production at room temperature and treatment of the flexible substrate with exposure times varying from 10 seconds to 20 minutes in the presence of a metal agent and obtainment of the treated flexible substrate;

STEP 5—treated flexible substrate recovery step.

DETAILED DESCRIPTION OF THE INVENTION

Figure 1:
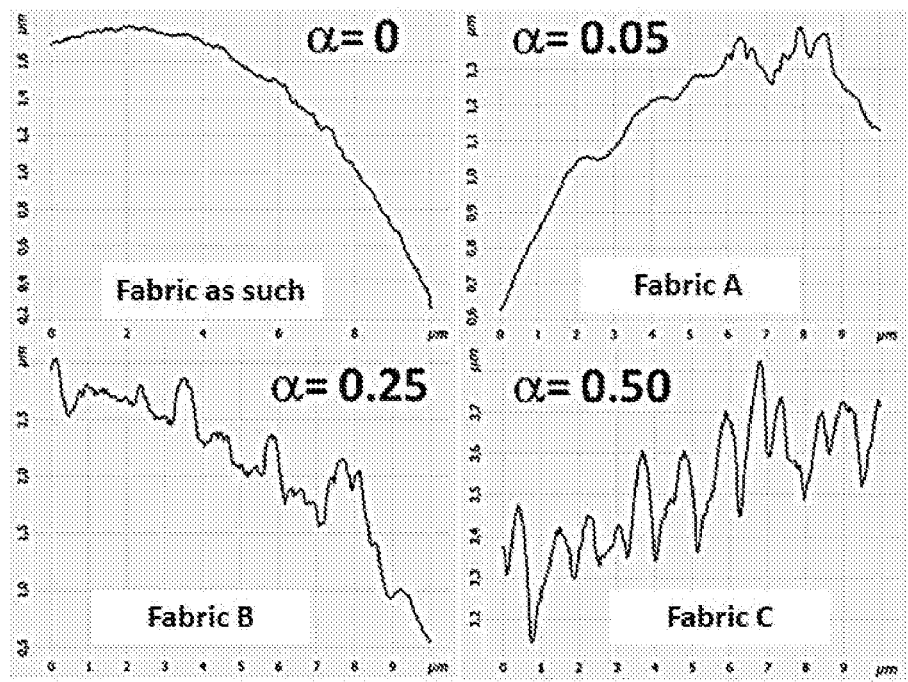
FIG. 1 and FIG. 2 show the roughness indexes using the parameters α and β measured by atomic-force microscopy (AFM) on individual threads of fabrics subjected to plasma treatment by the process according to the present invention. The fabrics in question are made of polyester monofilament (PET). In both figures, the image in the upper left refers to the thread of the untreated fabric (fabric as such). These two images of each figure show the absence of relevant morphological structures. Other images, instead, refer to threads of fabrics treated with plasma for 2 minutes, 5 minutes and 20 minutes, referred to respectively as Fabric A, Fabric B and Fabric C.

For the purposes of the present invention, flexible substrate preferably means a substrate in the form of polymeric material in woven fabric or nonwoven fabric, made with polyamides and/or polyesters, polyacrylonitrile, viscose, polymeric membranes made of polyethersulfones, polypropylene, polyvinylidene fluoride, polyacrylonitrile, viscose, hollow fibre membranes in polyethylene, polypropylene, polytetrafluoroethylene, polysulfones, polyamides, cellulose, viscose or a paper substrate.

The thickness of the flexible layer is of between 15 μm and 500 μm, preferably between 15 and 200 μm, more preferably between 20 and 200 μm.

For producing the filter material, the flexible substrate is plasma-treated to modify its surface properties. The plasma treatment has the purpose of modifying both the chemical characteristics and the morphological characteristics of the surface of the flexible substrate. In particular, after the treatment the surface appears to be more oxidized, i.e. it has a higher density of oxygen-containing functional groups (e.g. hydroxyl groups, carboxyl groups, carbonyl groups). From the morphological point of view, the plasma-treated surface is rougher than the untreated surface, with depressions and protrusions on a micro- and nanometric scale.

The plasma treatment can be carried out by using various types of plasma sources, such as e.g.: radio frequency sources in vacuum (RF), medium frequency sources (1-200 KHz), microwave sources (MW).

The plasma is generated at low pressure, namely in rooms containing gas at pressure values lower than the atmospheric pressure. The pressures reached in step 3 and the working pressures of step 4 generally vary from 0.001 mbar to 10 mbar, preferably from 0.01 to 1 mbar. In particular, the ideal operating conditions are between 0.05 and 0.5 mbar. The metal agent can be introduced in a mixture with the process gas, as a precursor containing a metal or in the form of metal powder. Alternatively, the antenna (the electrode connected to the power generator) can be the metal source, due to the relative erosion (under appropriate operating conditions, e.g. at pressures preferably between 0.01 and 1 mbar, more preferably between 0.05 and 0.5 mbar) of the metals contained in said antenna, with a consequent formation of clusters deposited on the surface.

The plasma can be produced with different electromagnetic sources, i.e. sources having a different frequency and a different geometry.

The energy density used for the treatment may vary from 1 $J/cm^2$ to 1000 $J/cm^2$, preferably from 10 to 1000 $J/cm^2$. The power density may vary from 0.02 $W/cm^2$ to 10 $W/cm^2$, preferably from 0.2 to 1 $W/cm^2$. The plasma treatment temperatures according to the present invention are those typical of cold plasmas, i.e. the temperature of the total gas mass in plasma phase is of the same order of magnitude as the environment temperature, preferably between 20° C. and 40° C. Therefore, in order to maintain the treatment temperature between 20° C. and 40° C., the flexible material has not to be arranged on the cathode, i.e. it has not to be arranged on the electrode supplied by the power generator for the plasma generation.

The gases which can be used for the plasma treatment in step 3 and 4 are air, oxygen, argon, $SF_6$, $CF_4$ or mixtures thereof. Oxygen or mixtures of argon and oxygen are preferably used.

The metals may be e.g. Al, Cu, Zn, Ag, Ti, Ni, Zr, Au, in the form of a powder or in the form of a precursor. Precursor means an inorganic or organic compound with a metal element. For example, inorganic compound means a hydride, organic compound means an organometallic compound. The precursor containing the metal is diluted in the gas and dissociated in plasma to form a metal or a metal oxide.

As previously explained, the flexible substrate to be treated has not to be arranged on the cathode, i.e. it has not to be arranged on the electrode connected to the power generator used for the plasma generation. The plasma treatment of the flexible substrates can be carried out in continuous, on reels of material or on samples of material, these latter being of variable size depending on the size of the reactor used. In both cases, the plasma treatment comprises the aforesaid steps, namely:

1. STEP 1—placing the material to be treated (reel or sample of flexible substrate) in the plasma reactor on the grounded electrode or close to said grounded electrode;
2. STEP 2—evacuation and degassing: a pumping step wherein the entire system is evacuated and brought to low pressures, anyway higher than $10^{-6}$ mbar. In this step there is a possible degassing of the flexible substrate, which loses much of the air and moisture it contains;
3. STEP 3—filling step: the reactor is filled with the process gas, optionally containing powders or metal-containing gas or steam. The desired treatment pressure, of between 0.001 and 10 mbar, is reached under flow conditions inside the reactor;

4. STEP 4—plasma production and treatment: plasma is generated and the treatment of the flexible substrate is carried out with exposure times varying from 10 seconds to 20 minutes in the presence of a metal agent, wherein said metal agent is selected among:
   a. a metal precursor in vapour phase mixed with the process gas
   b. nanometric metal powders mixed with the process gas or contained in the process chamber
   c. metal coming from the sputtering process of the material covering or constituting the antenna, i.e. the electrode connected to the power generator for generating the plasma 5. STEP 5—treated flexible substrate recovery step.

For the purposes of the present invention, when in the process according to the present invention, step 1 states that the flexible substrate is arranged close to the grounded electrode, this means that the substrate, for example in the case of a continuous reel treatment, is arranged at a distance of between 0.1 mm and 100 mm, preferably between 0.1 mm and 50 mm, from the grounded electrode.

STEP 4 is particularly relevant, since the surface modification of the material occurs during this step. This change is the result of several simultaneous processes:

Removal of material from the surface (chemical and physical etching).

Processes deriving from the presence of metal, such as for example the above mentioned sputtering of metal material, coming from the same electrodes that generate plasma. A typical example of a metal material that may be subjected to this treatment is aluminium, which may constitute the electrodes. The metal material subjected to sputtering, optionally oxidized due to the presence of oxygen in the chamber, is deposited on the surface of the substrate to be treated. XPS analyses showed that the percentage of metal material on the surface of the treated substrates might reach 10% (atomic percentage). However, the sputtering-subjected metal does not form a continuous coating on the surface of the substrate; its micro/nanoparticles are deposited in an isolated manner on the surface, thus forming non-etchable micro-masks and promoting the formation of morphological micro- and nanostructures, with a height of between 1 nm and a few micron and an aspect ratio lower than 1 or around 1. The metal (or metal oxide) in the surface also contributes to raise the wettability (surface energy) of the substrate. Alternatively, the metal is contained in the mixture of the process gas in the form of a nanoparticle or in vapour phase.

Surface heating in portions of the treated material on a micro- and nanometric scale, also facilitated by the presence of the metal material coming from the sputtering. This surface heating leads to localised microfusions of the material forming the substrate, which contribute to the formation of morphological micro- and nanostructures.

Surface insertion (grafting) of polar groups.

With respect to the processes described in the state of the art, there are several advantages:

1. the filtering surfaces are made in a single step, and do not require a coating deposition. The process is therefore clean and environmentally sustainable, since it does not employ reactive pollutants and does not use water or other solvents;

2. the filtering surfaces are not necessarily super-hydrophilic: the oil/water separation is also effective with filters that show contact angles with water much larger than 10°. In particular, the separation is effective for contact angles with water between 0° and 70°. Preferably, the contact angle with water is between 0° and 50°.

The modification method is general, namely it can be used for separating any mixture of immiscible liquids. What changes, depending of the liquids to be separated, is the type of the starting substrate, which is selected with a filtration-suitable dimensional structure.

With respect to the processes described in the state of the art, the method is different for the following characteristics:

1. The filtering surfaces are made in a single step, and do not require a coating deposition.

2. The plasma process includes the deposition of small percentages of metal particles that favour the formation of nanostructures and the localized melting of the material to form crystalline domains and morphological structures having a height ranging between 1 nm and a few micron and an aspect ratio lower than 1 or around 1.

The proper selection of the filtering structure therefore allows, as a result of the plasma treatment, obtaining the separation of different mixtures of immiscible liquids. For the separation of water (or aqueous solutions) from oils or hydrocarbons (or mixtures thereof), fabrics made of a monofilament with a mesh opening ranging from 0.01 to 60 µm, e.g. from 0.01 to 0.5 µm, or from 1 µm to 60 µm, may be used.

In order to ensure that the filter obtained by these treated fabrics is effective in separating water/oil, it has been noted that the roughness index expressed according to the aforesaid parameters $\alpha$ and $\beta$ must be:

$\alpha \geq 0.20$ $\beta \geq 10\%$.

Figure 2:
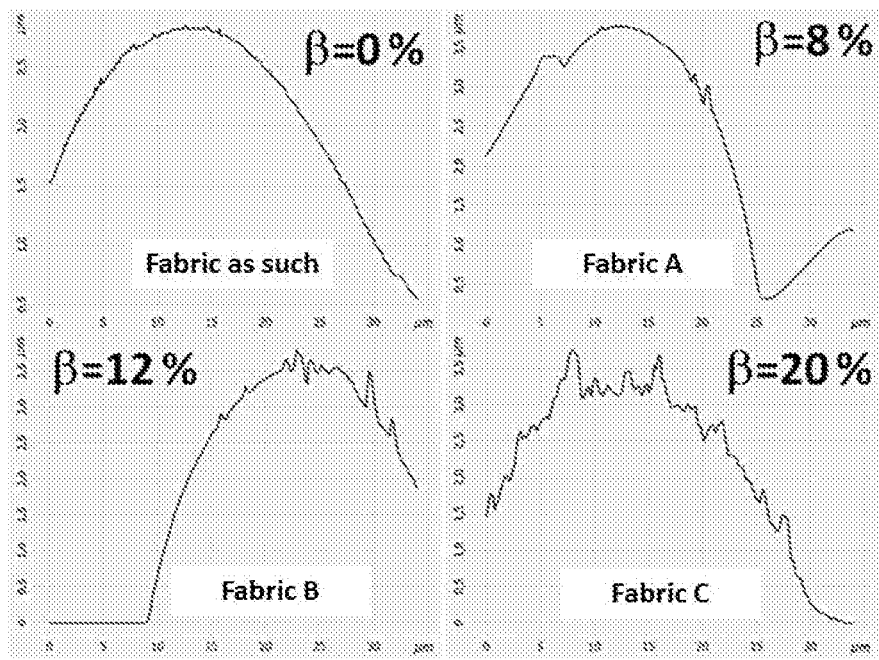

If specific reference is made to the fabrics shown in FIGS. 1 and 2, the fabric as such and the fabric A do not allow the oil/water separation by filtration, while the fabric B and the fabric C are appropriate for this process.

For the purposes of the present invention, the roughness index is evaluated according to the following parameters:

Vertical dimension, i.e. the height of the micro- and nanostructures formed on the surface of the flexible substrate as a result of the plasma treatment Aspect ratio of these structures, i.e. the ratio between the height of the structures and their horizontal extension, i.e. their base diameter Parameter $\alpha$: it is the ratio between the average vertical size of the structures (micro and/or nano protuberances) and the average horizontal size between the top of said micro and nano protuberances Parameter $\beta$: it is evaluated for the woven flexible substrate, referring to the yarn that composes it, as the percentage ratio between the portion of the area of the thread occupied by the structures and the total surface area of the thread.

Nonwoven fabrics or polymeric membranes with a pore diameter ranging from 0.005 to 60 µm, preferably from 0.005 to 10 µm, can also be used for the separation of water (or aqueous solutions) from oils or hydrocarbons (or mixtures thereof).

However, filters of the woven type are ineffective for the separation of mixtures of immiscible organic liquids (e.g. mixture of hexane/acetonitrile).

In this case, usable filtering structures are: nonwoven fabrics, polymeric membranes or filter paper. For filtering immiscible organic liquids, these materials preferably have a porosity less than 1 µm, more preferably of between 0.005 and 0.5 µm. The structure of these materials, constituted by fibres dispersed and arranged in several layers in a unorganized manner, allows forming a high number of capillary bridges of the filtered liquid, bridges which prevent the passage of the other retained liquid. The following examples of the method according to the present invention are reported for illustrative but not limitative purposes.

Example 1

A polyester (PET) fabric, made by mono thread weaving (mesh opening 25 µm, thickness 60 µm), is arranged in a radio frequency plasma reactor, operating at low pressure. The plasma reactor consists of a vacuum chamber containing two flat and parallel circular plates (each having an area of 314 cm$^2$). The upper plate (also called cathode or antenna) is connected to the radio frequency power generator, while the lower plate, housing the PET sample (size 10 cm×10 cm), is grounded. The air is evacuated from the reactor until reaching a residual chamber pressure of $10^{-5}$ mbar. Then oxygen ($O_2$ flow 4.5 sccm) is introduced, thus maintaining a chamber working pressure of 0.09 mbar, and plasma is generated at a power of 200 W (power density of 0.64 W/cm2). The sample is exposed to plasma under these conditions for 20 minutes. Analogously, four further samples of the same material and under the same pressure and power conditions are prepared and exposed to plasma for 10 minutes, 5 minutes, 2 minutes, 1 minute, respectively.

The five samples thus prepared are tested for oil/water separation. A mixture constituted by 40 ml of water and 10 ml of oil is prepared for each fabric sample. Each mixture is vigorously stirred by a glass rod, and is then immediately filtered on the respective plasma-treated fabric filter. The same non-plasma-treated polyester fabric is tested by filtration of a mixture water/oil prepared as previously described.

| Sample | Filtration result |
| --- | --- |
| Untreated PET | F |
| PET 1 Minute | F |
| PET 2 minutes | F |
| PET 5 minutes | OK |
| PET 10 minutes | OK |
| PET 20 minutes | OK |

F: failed separation, the filter let both the water and the oil in the mixture pass through.
OK: successful separation, the filter let the water in the mixture pass through and retains the oil.

Example 2

A polyester (PET) fabric made of a mono thread (mesh opening 25 µm, thickness 60 µm) is arranged on the grounded electrode of the plasma reactor described in example 1. The air is evacuated from the reactor until reaching a residual chamber pressure of $10^{-5}$ mbar. Then oxygen (flow 4.5 sccm) is introduced, thus maintaining a working pressure of 0.09 mbar, and plasma is generated at a power of 200 W (power density of 0.64 W/cm2). The sample is exposed to plasma under these conditions for 20 minutes. The sample is tested for the separation hexane/acetonitrile. For comparison, the same non-plasma-treated polyester fabric is tested. A mixture constituted by 40 ml of acetonitrile and 10 ml of hexane is prepared for each fabric sample. Each mixture is vigorously stirred by a glass rod and is then immediately filtered on the respective filter. The results are shown in the table. Both filters fail in the separation hexane/acetonitrile.

| Sample | Filtration result |
| --- | --- |
| Untreated PET | F |
| PET 20 minutes | F |

F: failed separation, the filter let both the acetonitrile and the hexane in the mixture pass through.
OK: successful separation, the filter let the acetonitrile in the mixture through and retains the hexane.

Example 3

A polyester (PET) fabric made of a mono thread (mesh opening 25 µm, thickness 60 µm) is arranged on the grounded electrode of the plasma reactor described in example 1. The air is evacuated from the reactor until reaching a residual chamber pressure of $10^{-5}$ mbar. Then oxygen (flow 4.5 sccm) is introduced, thus maintaining a working pressure of 0.09 mbar, and plasma is generated at a power of 200 W (power density of 0.64 W/cm2). The sample is exposed to plasma under these conditions for 20 minutes. The sample is tested for the separation of a mixture consisting of an aqueous emulsion (oil in water) and oil. For comparison, the same non-plasma-treated polyester fabric is tested. A mixture constituted by 40 ml of an aqueous emulsion and 10 ml of oil is prepared for each fabric sample. Each mixture is vigorously stirred by a glass rod, and is then immediately filtered on the respective filter. The results are shown in the table.

| Sample | Result filtration |
| --- | --- |
| Untreated PET | F |
| PET 20 minutes | OK |

F: failed separation, the filter let both the acetonitrile and the hexane paas in the mixture through.
OK: successful separation, the filter let the acetonitrile in the mixture pass through and retains the hexane.

Example 4

A sample of filter paper (filter paper Labor, 67 g/m2, Cordenons S.p.A. filters division, thickness 200 µm) is arranged on the grounded electrode of the plasma reactor described in example 1. The air is evacuated from the reactor until reaching a residual chamber pressure of $10^{-5}$ mbar. Then oxygen (flow 4.5 sccm) is introduced, thus maintaining a working pressure of 0.09 mbar, and plasma is generated at a power of 200 W (power density of 0.64 W/cm2). The sample is exposed to plasma under these conditions for 10 minutes. The sample is tested for the separation hexane/acetonitrile. For comparison, the same non-plasma-treated filter paper Labor is tested. A mixture constituted by 40 ml of acetonitrile and 10 ml of hexane is prepared for each sample. Each mixture is vigorously stirred by a glass rod, and is then immediately filtered on the respective filter paper. The results are shown in the table. The plasma-modified filter paper effectively separates the mixture of hexane/acetonitrile.

| Sample | Filtration result |
| --- | --- |
| Untreated Labor filter paper | F |

-continued

| Sample | Filtration result |
|---|---|
| Labor filter paper 10 minutes | OK |

F: failed separation, the filter let both the acetonitrile and the hexane in the mixture pass through.
OK: successful separation, the filter let the acetonitrile in the mixture pass through and retains the hexane.

Example 5

A sample of the filter paper (filter paper Labor, 67 g/m2, Cordenons S.p.A. division filters, thickness 200 μm) is arranged on the grounded electrode of the plasma reactor described in example 1. The air is evacuated from the reactor until reaching a residual chamber pressure of $10^{-5}$ mbar. Then oxygen (flow 4.5 sccm) is introduced, thus maintaining a working pressure of 0.09 mbar, and plasma is generated at a power of 200 W (power density of 0.64 W/cm2). The sample is exposed to plasma under these conditions for 10 minutes. The sample is tested for the separation of a mixture consisting of an aqueous emulsion (oil in water) and oil. For comparison, the same non-plasma-treated filter paper Labor is tested. A mixture constituted by 40 ml of an aqueous emulsion and 10 ml of oil is prepared for each sample of fabric. Each mixture is vigorously stirred by a glass rod, and is then immediately filtered on the respective filter. The results are shown in the table.

| Sample | Filtration result |
|---|---|
| Untreated Filter paper Labor | F |
| Filter paper Labor 10 minutes | OK |

F: failed separation, the filter let both the water and the oil in the mixture pass through.
OK: successful separation, the filter let the water in the mixture pass through and retains the oil.

Example 6

On the untreated sample made of PET fabric (mesh opening 25 μm, thickness 60 μm) and on samples treated with plasma respectively for 2 minutes (Fabric A), for 5 minutes (Fabric B) and for 20 minutes (Fabric C) atomic-force microscopy (AFM) analyses were carried out on individual fabric threads for filtration. The fabrics in question are made of polyester (PET) monofilament to evaluate the roughness.

The obtained results are reported in FIGS. 1 and 2.

In both figures, the image in the upper left refers to the thread of untreated fabric (fabric as such). These two images show the absence of relevant morphological structures. The other images, instead, refer to threads of plasma-treated fabrics, which are referred to as Fabric A, Fabric B and fabric C.

Only fabrics C and D allow an effective separation of oil and water.

Example 7

A polyester (PET) fabric made of a mono thread (mesh opening 25 μm, thickness 60 μm) is arranged on the radio frequency electrode (also called cathode or antenna) of the plasma reactor described in example 1. The air is evacuated from the reactor until reaching a residual chamber pressure of $10^{-5}$ mbar. Then oxygen (flow 4.5 sccm) is introduced, thus maintaining a working pressure of 0.09 mbar and plasma is generated at a power of 200 W (power density of 0.64 W/cm2). The sample is exposed to plasma under these conditions for 1 minute. Analogously, another sample of the same material and under the same conditions of pressure and power is prepared and exposed to plasma for 2 minutes.

The two samples thus prepared are tested for oil/water separation. A mixture constituted by 40 ml of water and 10 ml of oil is prepared for each sample of fabric. Each mixture is vigorously stirred by a glass rod and is then immediately filtered on the respective filter of the plasma-treated fabric. For comparison, the same non-plasma-treated polyester fabric is tested by filtering a mixture water/oil prepared as previously described.

| Sample | Filtration result |
|---|---|
| Untreated PET | F |
| PET 1 Minute | F |
| PET 2 minutes | The fabric has already melted |

F: failed separation, the filter let both the water and the oil in the mixture pass through.
OK: successful separation, the filter let the water in the mixture pass through and retains the oil.

The invention claimed is:
1. Surface treatment process of a substrate of flexible material having a thickness of between 15 and 500 μm comprising the following steps:
   STEP 1—placing the flexible material to be treated in a plasma reactor on a grounded electrode, or arranged at a distance of between 0.1 mm and 100 mm from said grounded electrode;
   STEP 2—evacuating and degassing step, wherein the entire system is evacuated and brought to low pressures, higher than 10-6 mbar;
   STEP 3—filling the reactor with the process gas up to a pressure of between 0.001 and 10 mbar; and
   STEP 4—room temperature plasma production and flexible substrate treatment step, with exposure times ranging from 10 seconds to 20 minutes in the presence of a metal agent and obtainment of the treated flexible material, wherein said metal agent is selected among:
   a. a metal precursor in vapour phase mixed with the process gas;
   b. nanometric metal powders mixed with the process gas or contained in the process chamber;
   metal coming from a sputtering process of material covering or constituting an antenna or the electrode connected to a power generator for generating the plasma,
   STEP 5—treated flexible substrate recovery step.
2. Surface treated material obtained with the process according to claim 1, starting from a substrate selected from the class consisting of:
   I) a polymeric fabric material made of polyamides and/or polyesters, polyacrylonitriles, viscose.
   II) a polymeric nonwoven fabric material made of polyamides and/or polyesters, polyacrylonitrile, viscose;
   III) polymeric membranes made of polyethersulfone, polypropylene, polyvinylidene fluoride, polyamides, polyacrylonitrile, viscose;
   IV) membranes of hollow fibre of polyethylene, polypropylene, polytetrafluoroethylene, polysulfone, polyamide, cellulose, viscose.
   V) a paper.
3. A process for the filtration and separation of two immiscible liquid phases A and B with surface treated material according to claim 2, wherein the liquid phase A) present in a concentration ranging from 99.99% to 50%, passes through said surface treated material, while the liquid phase B, present in a concentration ranging from 0.01% to 50%, is retained thereby.

4. The process according to claim 3, wherein, when said surface treated material is obtained by the substrate of class I), said plasma-treated flexible material used for the separation of the two immiscible liquid phases is in the form of fabric with mesh ranging from 0.01 μm to 60 μm, and the liquid A is water or an aqueous solution and liquid B is an oil or a hydrocarbon.

5. The process according to claim 4, wherein said mesh has a size of between 0.01 and 0.5 μm.

6. The process according to claim 4, wherein said mesh has a size of between 1 μm and 60 μm with a roughness index expressed with the parameters $\alpha$ and $\beta$, wherein $\alpha \geq 20$, and $\beta \geq 10\%$, wherein a is the ratio between the average vertical size of the micro and/or nano protuberances and the average horizontal size between the top of said micro and nano protuberances, and $\beta$ is the percentage ratio between the portion of the area of the thread occupied by the structures and the total surface area of the thread.

7. The process according to claim 3, wherein, when said surface treated material is obtained by a substrate of class III), IV) or V) the surface treated material thereby obtained, used for the separation and filtration of the two immiscible liquid phases has a porosity of between 0.005 and 60 μm.

8. The process according to claim 7, wherein, when said immiscible liquid phases are two immiscible organic liquids, the surface treated material has a porosity between 0.05 and 1 μm.

* * * * *